(12) United States Patent
Hwang

(10) Patent No.: US 8,990,274 B1
(45) Date of Patent: Mar. 24, 2015

(54) GENERATING A PRESENTATION ASSOCIATED WITH A SET OF INSTRUCTIONS

(75) Inventor: Douglas C. Hwang, New York, NY (US)

(73) Assignee: Audible, Inc., Newark, NJ (US)

( * ) Notice: Subject to any disclaimer, the term of this patent is extended or adjusted under 35 U.S.C. 154(b) by 400 days.

(21) Appl. No.: 13/468,985

(22) Filed: May 10, 2012

(51) Int. Cl.
*G06F 3/00* (2006.01)
(52) U.S. Cl.
USPC .......................................................... 708/133
(58) Field of Classification Search
CPC .............. G01G 19/4146; G06F 19/324; G06F 19/3406; G06F 19/3475; F24C 7/082
USPC .......................................................... 708/133
See application file for complete search history.

(56) References Cited

U.S. PATENT DOCUMENTS

2013/0046567 A1\* 2/2013 Swanson ...................... 705/7.11
2013/0238713 A1\* 9/2013 Abuelsaad et al. ........... 709/206

\* cited by examiner

*Primary Examiner* — Tan V. Mai
(74) *Attorney, Agent, or Firm* — Knobbe, Martens, Olson & Bear, LLP

(57) ABSTRACT

Systems and methods are provided for presenting a set of instructions to a user, such as instructions associated with a recipe. In some embodiments, recipe data may be retrieved and analyzed to identify one or more recipe instructions included in the recipe. A time estimate associated with at least one of the identified recipe instructions may be determined, where the time estimate represents an estimated time for the identified recipe instruction to be completed by the user. The recipe instruction may then be presented to the user, such as by presenting audio data or visual data. Based at least in part on a determination that an amount of time equal to the time estimate has elapsed after presenting the recipe instruction to the user, one or more additional recipe instructions may then be automatically presented to the user.

26 Claims, 8 Drawing Sheets

GENERATING A PRESENTATION ASSOCIATED WITH A SET OF INSTRUCTIONS

BACKGROUND

People often consult recipes when cooking, baking, or otherwise preparing food. The recipe may be in a cook book, a handwritten note, a printout from a computer, or from some other source. An individual consulting a recipe while cooking will often place the recipe somewhere in the kitchen so that he can consult the recipe throughout the preparation and cooking process. A common format for a recipe is a list of ingredients, followed by a list of directions that include steps or actions to take using the listed ingredients. Accordingly, an individual consulting a recipe will often gather the listed ingredients and then follow the listed directions. During the preparation and cooking process, the individual frequently needs to consult the recipe, such as a recipe printed on a piece of paper. Each time he consults the recipe, he may need to find his current place in the directions before determining the next step or action to take. If the directions of a recipe refer to a cooking term that the individual is not familiar with, he typically would need to consult another source to find more information regarding the term. Similarly, a recipe may assume certain knowledge regarding food consistency, meat preparation, measurements, or other information that is not sufficiently explained in the recipe to be understood by some individuals, such as a novice cook.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
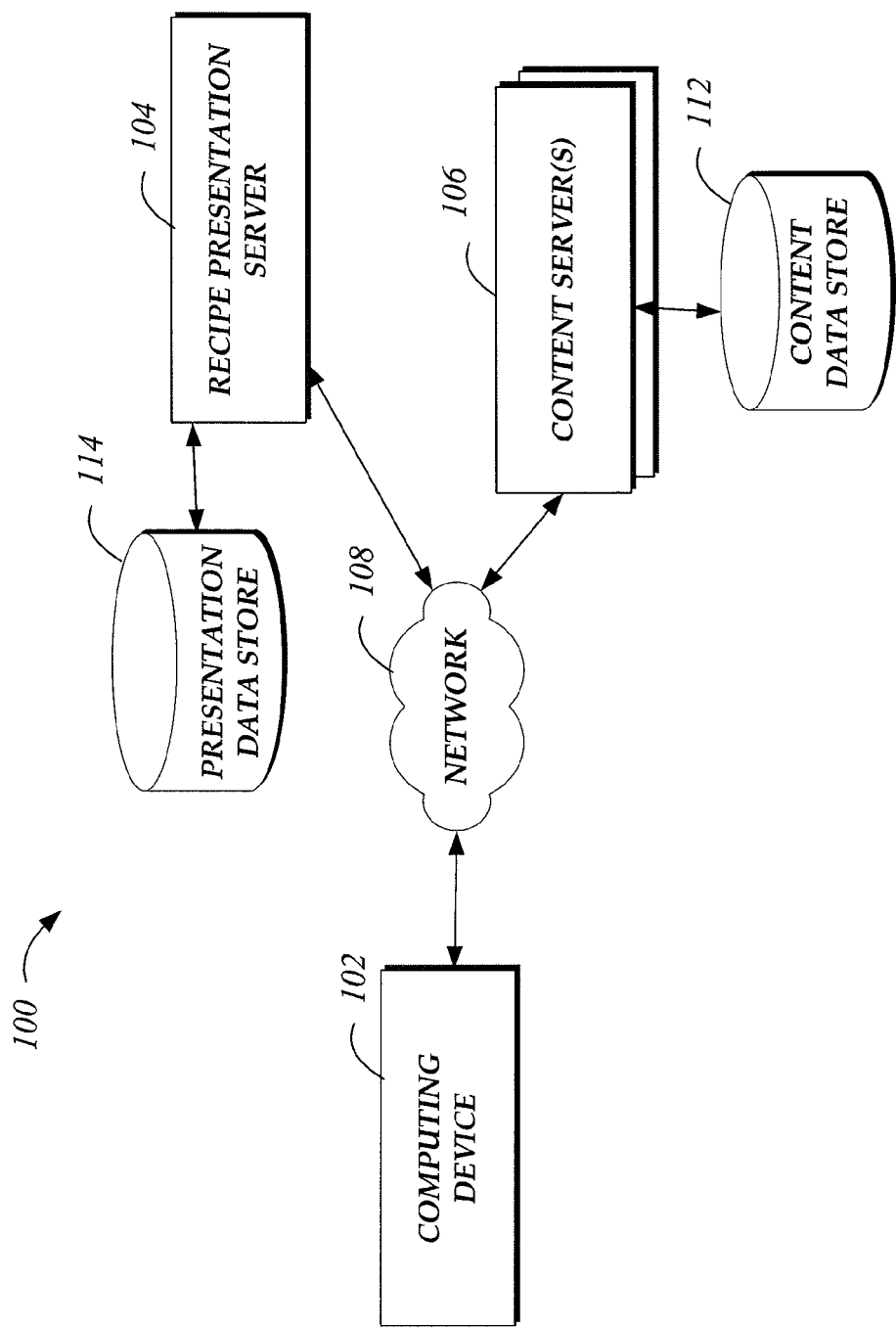
FIG. 1 is a block diagram depicting an illustrative operating environment in which a recipe presentation may be generated and then presented by a computing device.

Generally described, aspects of the present disclosure relate to generating a recipe presentation based on a given recipe, and presenting the generated recipe presentation to a user. For example, a recipe presentation as described herein may be presented by a computing device to a user while the user is in his kitchen preparing food according to the recipe. In some embodiments, a recipe presentation module as disclosed herein may present the recipe to the user in a manner that enables the user to follow the instructions of the recipe with either minimal or no interaction with the computing device during the presentation. For example, the recipe presentation module may cause presentation of a recipe instruction visually and/or audibly to the user. The recipe presentation module may then wait to present the next instruction for an amount of time determined by the recipe presentation module as an estimate of the amount of time the user will take to complete the instruction. The recipe presentation module may determine this delay time, for example, based on an analysis of the given recipe instruction and stored data regarding estimated lengths of time associated with one or more actions included in the recipe instruction. During the recipe presentation, in some embodiments, the recipe presentation module may present the user with additional content, such as image, video or audio data that provides more information regarding how to complete a given recipe instruction. The user may additionally, in some embodiments, be able to step backwards or forwards through the recipe instructions in order to alter the timing determined by the recipe presentation module.

As described herein, a recipe presentation may generally include visual and/or audio content that may be presented for display and/or for audio output by a computing device in association with recipe information. In some embodiments, a recipe presentation may refer to the entire visual and audio output presented to the user. In other embodiments, a recipe presentation may refer specifically to visual elements, such as images, text and/or video. In other embodiments, a recipe presentation may refer specifically to audio content, such as spoken words corresponding to the recipe instructions and/or additional audio content associated with individual recipe instructions.

In some embodiments, a recipe presentation module as disclosed herein may parse recipe data associated with a recipe to identify a number of recipe instructions. Each of the recipe instructions may, in some embodiments, include one or more actions to be performed by a user. For each recipe action identified, the recipe presentation module may analyze the identified action to determine a time estimate associated with the action, where the time estimate represents an estimated time for the identified action to be performed by the user. In some embodiments, for one or more of the recipe actions, the recipe presentation module may also determine additional content to associate with the recipe action. The additional content may include, for example, visual content and/or audio content providing the user with more information associated with the action. The recipe presentation module may then present each recipe action to the user, where a time period between presentation of each recipe action is based at least in part on the time estimate determined for the given recipe action. In some embodiments, the recipe presentation module may present any additional content associated with a given recipe action during the time period determined for that recipe action.

FIG. 1 depicts an illustrative operating environment 100 in which a computing device 102 and/or a recipe presentation server 104 may generate a recipe presentation, and in which the recipe presentation may then be presented by the computing device 102. The depicted environment 100 includes a computing device 102, a recipe presentation server 104, and one or more content servers 106 communicatively connected by a network 108, such as the Internet. Those skilled in the art will recognize that the computing device 102 and/or recipe presentation server 104 may collectively be any of a number of computing devices that are capable of communicating over a network including, but not limited to, a laptop, personal computer, tablet computer, electronic book reader, personal digital assistant (PDA), hybrid PDA/mobile phone, mobile phone, smart phone, digital music player, and the like. In some embodiments, one of the computing device 102 and the recipe presentation server 104 may implement aspects of the present disclosure without cooperating with another computing device. In the illustrated embodiment, the computing device 102 may output audio content and/or visual content associated with a generated recipe presentation, which may include display of user interfaces such as those discussed below with reference to FIGS. 3, 4, 7 and 8. The computing device 102 is discussed in more detail below in reference to FIG. 2.

In the illustrated embodiment, the recipe presentation server 104 may generate a recipe presentation, such as by accessing information associated with text, image, audio and/or video content stored in one or more data stores, such as presentation data store 114, and/or communicating with one or more content servers 106. For example, the recipe presentation server 104 may generate a presentation, and may then send the presentation information to computing device 102 for display and/or audio playback on computing device 102, as will be further discussed below. In other embodiments, the computing device 102 may generate a recipe presentation without communicating with recipe presentation server 104. In some embodiments, the recipe presentation server 104 and/or content server(s) 106 may include computer hardware and software components similar to those described below with respect to the computing device 102.

In the environment shown in FIG. 1, the computing device 102 and/or recipe presentation server 104 may communicate with the content server 106 via a communication network 108, such as the Internet or other communications link. Communications between the computing device and/or recipe presentation server and the one or more content servers 106 may be secure, such as by encrypting or encoding the data exchanged. In some embodiments, the content server 106 may be operated by a third-party entity unrelated to the operator of the recipe presentation server 104. For example, the one or more content servers 106 may provide access to various content data stores, such as content data store 112, that include image content, video content, textual content, audio content, and/or other types of content that are available for public use and/or for use according to a license. For example, the content data store 112 may include recipes in various formats and/or images or videos associated with cooking.

As illustrated in FIG. 1, the content server 106 includes or communicates with a content data store 112. As further illustrated, the recipe presentation server 104 includes or communicates with a presentation data store 114. The presentation data store 114 may include data regarding generated presentations, recipes, additional content associated with one or more presentations, user data and preferences, and/or other information. Those skilled in the art will appreciate that the presentation data store 114 may be local to the recipe presentation server 104, may be remote to the recipe presentation server 104, and/or may be a network-based service itself. In other embodiments, the presentation data store 114 may be local to the computing device 102. Those skilled in the art will appreciate that the network 108 may be any wired network, wireless network or combination thereof. In addition, the network 108 may be a personal area network, local area network, wide area network, cable network, satellite network, cellular telephone network, etc., or combination thereof. Protocols and components for communicating via the Internet or any of the other aforementioned types of communication networks are well known to those skilled in the art of computer communications and, thus, need not be described in more detail herein.

Figure 2:
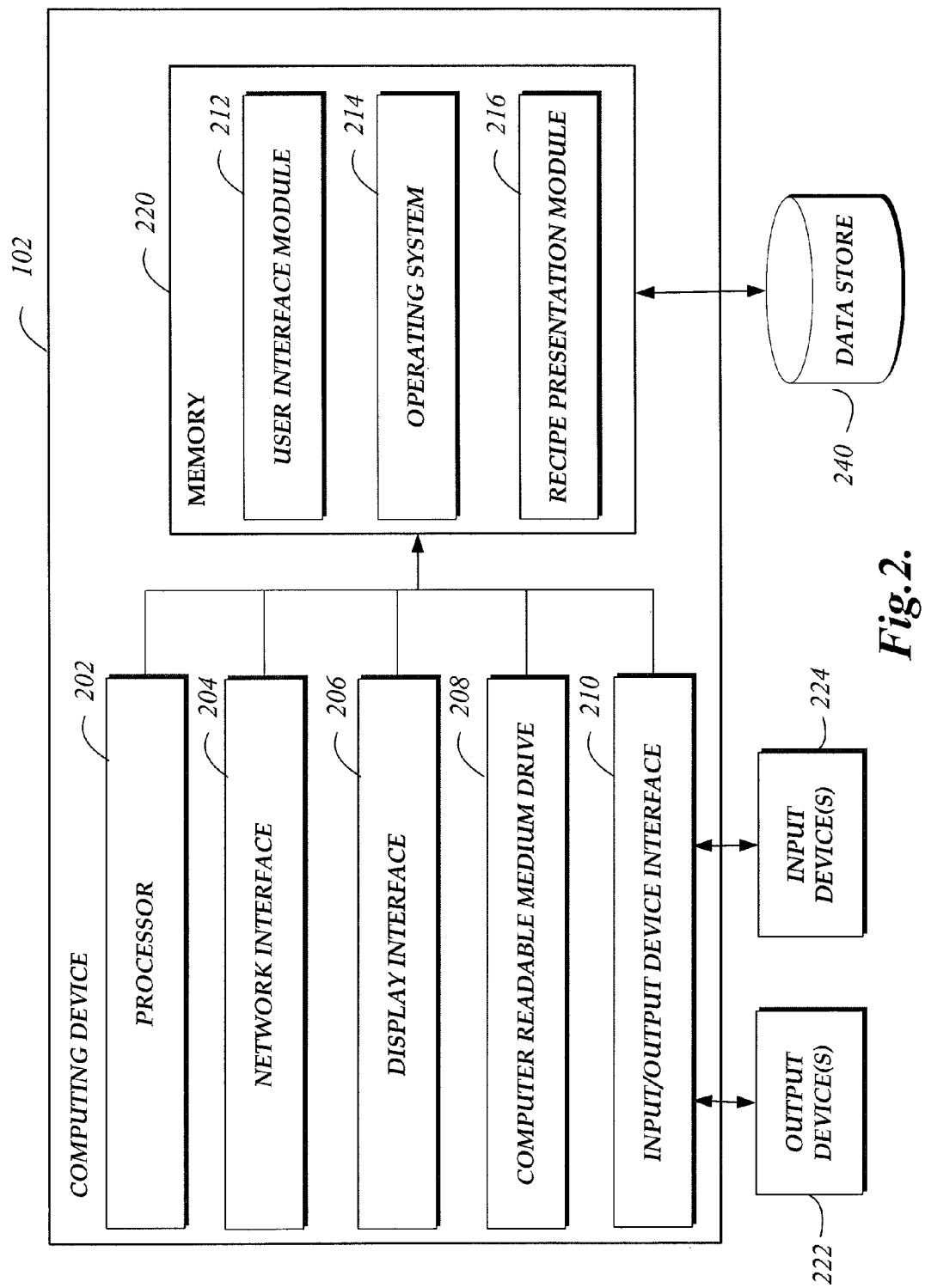
FIG. 2 depicts a general architecture of a computing device for presenting a recipe presentation.

FIG. 2 depicts a general architecture of a computing device 102 for presenting a recipe presentation to a user. The computing device 102 may have one or more processors 202 in communication with a network interface 204, a display interface 206, a computer readable medium drive 208, and an input/output device interface 210, all of which communicate with one another by way of a communication bus. The network interface 204 may provide connectivity to one or more networks or computing systems. The processor(s) 202 may thus receive information and instructions from other computing systems or services via a network. The processor(s) 202 may also communicate to and from memory 220 and further provide output information or receive input information via the display interface 206 and/or the input/output device interface 210. The input/output device interface 210 may accept input from one or more input devices 224, including, but not limited to, keyboards, mice, trackballs, trackpads, joysticks, input tablets, trackpoints, touch screens, remote controls, game controllers, velocity sensors, voltage or current sensors, motion detectors, or any other input device capable of obtaining a position or magnitude value from a user. The input/output interface 210 may also provide output via one or more output devices 222, including, but not limited to, one or more speakers or any of a variety of digital or analog audio capable output ports, including, but not limited to, headphone jacks, XLR jacks, stereo jacks, Bluetooth links, RCA jacks, optical ports or USB ports, as described above. The display interface 206 may be associated with any number of visual or tactile interfaces incorporating any of a number of active or passive display technologies (e.g., electronic-ink, LCD, LED or OLED, CRT, projection, etc.) or technologies for the display of Braille or other tactile information.

The memory 220 contains computer program instructions that the processor(s) 202 execute in order to implement one or more embodiments of the present disclosure. The memory 220 generally includes RAM, ROM and/or other persistent or non-transitory computer-readable media. The memory 220 may store an operating system 214 that provides computer program instructions for use by the processor(s) 202 in the general administration and operation of the computing device 102. The memory 220 may further include other information for implementing aspects of the present disclosure. For example, in one embodiment, the memory 220 includes a user interface module 212 that facilitates generation of user interfaces (such as by providing instructions therefor) for display. For example, a user interface may be displayed via a navigation interface such as a web browser installed on the computing device. In addition, memory 220 may include or communicate with an auxiliary data store 240. Data stored in the content data store 230 may include audio content, image content, textual content, and/or other data similar to that discussed above with respect to presentation data store 114.

In addition to the user interface module 212, the memory 220 may include a recipe presentation module 216 that may be executed by the processor(s) 202. In one embodiment, the presentation module 216 may be used to implement various aspects of the present disclosure, such as generating a recipe presentation and/or presenting a recipe presentation, as described further below. In certain embodiments of the present disclosure, the recipe presentation server 104 and/or content server(s) 106 may include several components that operate similarly to the components illustrated as part of the computing device 102, including a user interface module, processor, computer readable medium drive, etc.

Figure 3:
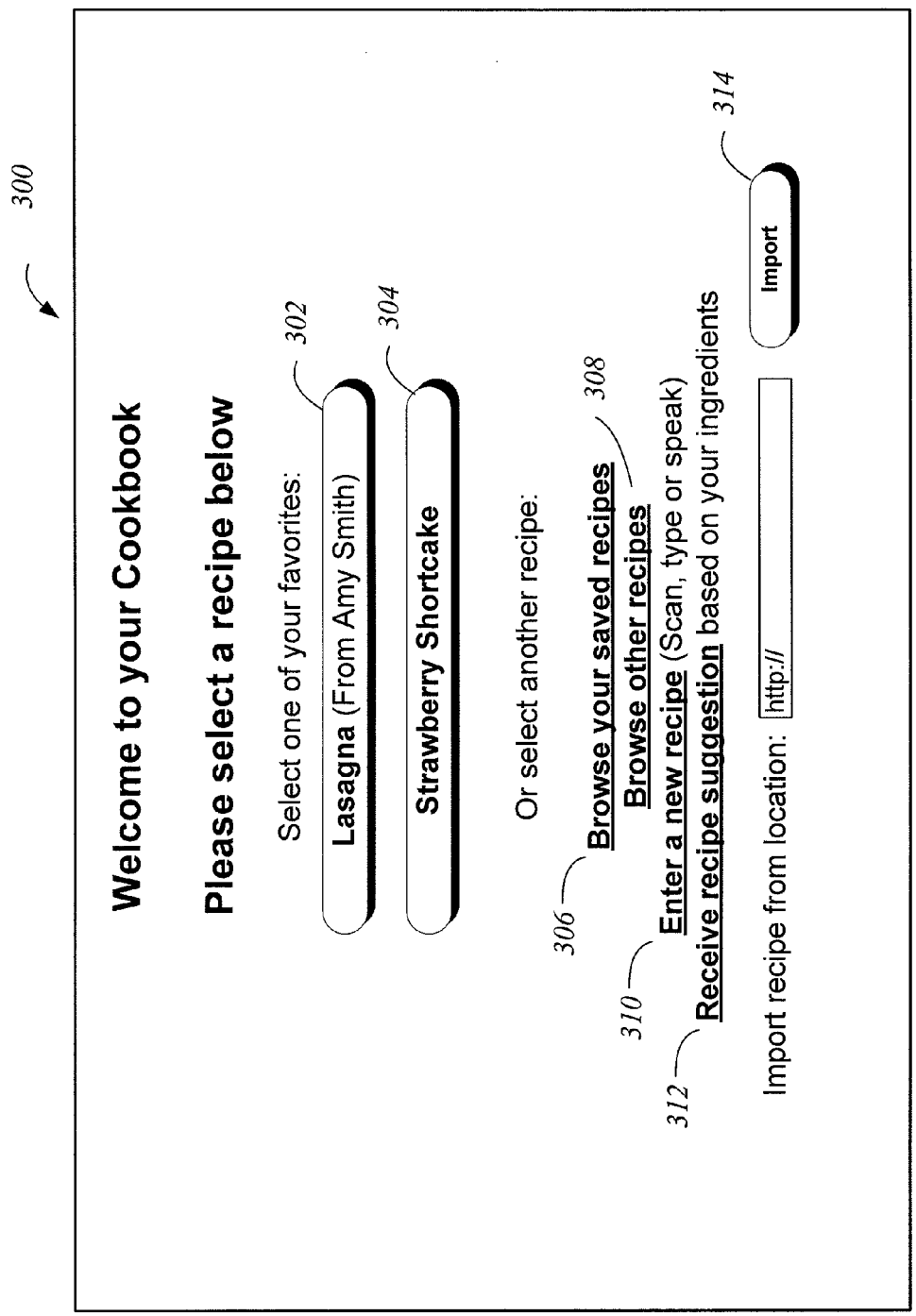
FIG. 3 is an illustrative user interface generated by a computing device that displays options for selecting a recipe from which a recipe presentation may be generated.

FIG. 3 is an illustrative user interface 300 generated by the computing device 102, and/or generated by the recipe presentation server 104 for display by the computing device 102, that displays options for selecting a recipe from which a recipe presentation may be generated. For example, user interface 300 may be generated for display on a tablet computer that a user has placed in his kitchen before beginning to prepare food or cook a meal. As used in the present disclosure, food that may be made or prepared by a user according to a recipe may include, in some embodiments, beverages, supplements, and/or other items meant for consumption by a person or animal. As illustrated, user interface 300 includes selectable options 302 and 304 corresponding to favorite recipes of the user. The recipe presentation server 104 and/or computing device 102 may have determined the favorite recipes of the user based on user data, such as data regarding recipes that the user has frequently used in the past and/or recipes that the user has rated highly. The user may select option 302 in order to request that the recipe presentation server 104 present a recipe presentation based on a specific recipe for lasagna. This lasagna recipe is indicated as a recipe from Amy Smith, who may be a friend of the user that gave the recipe to the user, or may be a well known chef that created the recipe. Similarly, the user may select option 304 in order to request that the recipe presentation server 104 present a recipe presentation based on a recipe for strawberry shortcake.

Illustrative user interface 300 also includes additional options from which the user may select a recipe from which the recipe presentation server 104 may generate a recipe presentation. The user may select option 306 in order to browse the user's saved recipes. These recipes may be, for example, recipes that have been stored by the user in local data store 240 or presentation data store 114. The saved recipes may include recipes that the user created and/or recipes that other users have stored in a data store, such as presentation data store 114, and which the user has flagged or otherwise indicated to the recipe presentation server 104 that he is interested in using. Alternatively, the user may select option 308 to browse other recipes. Selection of option 308 may result in presentation of a user interface that enables the user to browse or search recipes that are stored in one or more data stores, which may include data stores associated with recipe presentation server 104 and/or data stores associated with other third-party services, such as content data store 112.

The user may select option 310 in user interface 300 in order to enter a new recipe from which the recipe presentation server 104 may generate a recipe presentation. Selection of option 310 may present the user with a user interface from which the user, depending on the embodiment, may input recipe text data by typing, may use a scanner or camera to input image data of a recipe (which may be converted to text data by recipe presentation server 104, such as by using optical character recognition), and/or may speak or narrate a recipe (which may be converted to text data by the recipe presentation server 104, such as by using speech recognition methods).

The user may select option 312 in order to request that the recipe presentation server 104 determine one or more suggested recipes based on ingredients available to the user. In some embodiments, the user may have previously provided the recipe presentation server 104 with a list of ingredients and/or equipment currently in the user's kitchen. In other embodiments, selection of option 312 may prompt the user to enter ingredients available to the user in order for the recipe presentation server 104 to suggest a recipe. Once the recipe presentation server 104 retrieves or obtains the list of ingredients that are accessible to the user, the recipe presentation server 104 may search recipes stored in one or more data stores in order to determine recipes that include only ingredients that are currently accessible to the user. In some embodiments, one or more filters may then be applied by the recipe presentation server 104, such as a filter related to the type of food (such as breakfast, dinner entrée, baked goods, etc.) that the user has expressed interest in, and/or a filter applying user preferences associated with the user. Information identifying the matching recipes may then be displayed to the user, such that the user may select a recipe for which a recipe presentation should be generated by the recipe presentation server 104.

As another alternative for selecting a recipe, the user may select option 314 in order to enter a location or address from which the recipe presentation server 104 should retrieve a recipe, which may include a page or other file that includes text data corresponding at least in part to a recipe. The recipe presentation server 104 may then retrieve the file, identify the portion of the file corresponding to recipe data, and generate a recipe presentation based on the recipe data.

Figure 4:
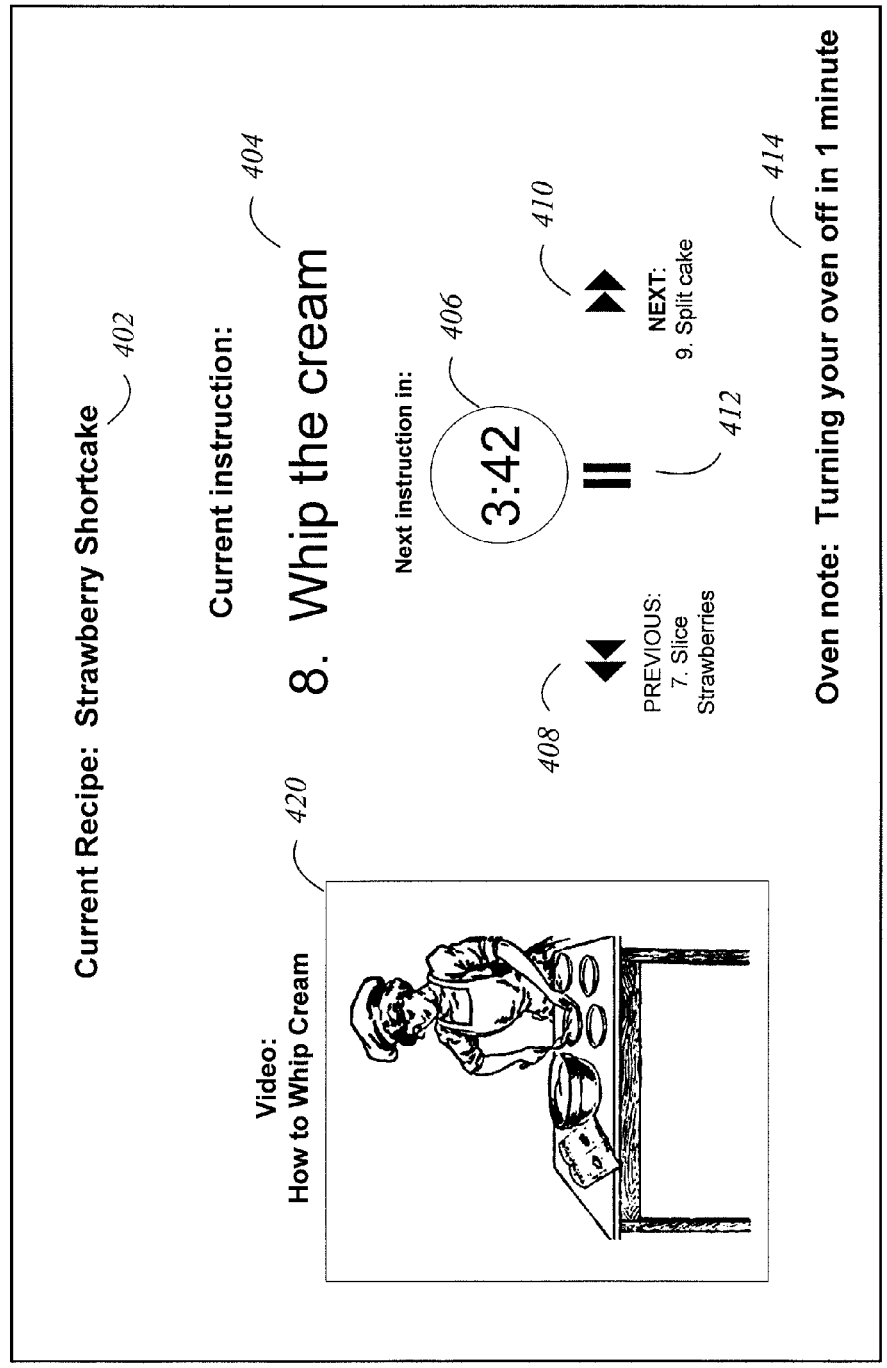
FIG. 4 is an illustrative user interface generated by a computing device that is displayed during a recipe presentation, which includes a current recipe instruction and additional content associated with the instruction.

FIG. 4 is an illustrative user interface 400 generated by the computing device 102 and/or the recipe presentation server 104 that may be displayed during a recipe presentation. The recipe presentation as illustrated may have been generated by the recipe presentation module 216 based on recipe 402, which is indicated as a recipe for making strawberry shortcake. As illustrated, the user interface 400 includes a current recipe instruction 404 (instructing the user to whip cream) and additional video content 420 associated with the instruction. The recipe presentation server 104 may have selected the additional video content 420 based at least in part on an analysis of current instruction 404. For example, the recipe presentation server 104 may have identified the word "whip" and/or the phrase "whip the cream" as representing an action for which a user may benefit from receiving additional instruction or information. The recipe presentation server 104 may have retrieved the video content 420 from a data store, such as content data store 112, based on one or more keywords associated with the video (such as "whip," for example). Determining additional content (such as additional video content 420) to present in association with a recipe instruction is discussed in more detail below with reference to FIG. 5.

Illustrative user interface additionally includes a timer 406, which indicates that the next recipe instruction will be automatically presented in three minutes and forty-two seconds. When current recipe instruction 404 was first presented to the user, the timer 406 may have started, for example, at four minutes, and may now be counting down towards zero. As discussed in more detail below, an initial time of four minutes for the timer 406 may have been determined by the recipe presentation module 216 as a time estimate associated with the current recipe instruction 404, which may represent an estimated time for the "whip the cream" action to be completed by the user. As discussed in more detail below, the recipe presentation module 216 may have determined the time estimate based at least in part on an analysis of the text of current recipe instruction 404. In some embodiments, once the timer 406 reaches zero, the recipe presentation module 216 may automatically present the next recipe instruction, such as by presenting a user interface that includes the next recipe instruction in place of current recipe instruction 404, may include new additional content 420, and may be associated with a new timer 406 (set to an initial time determined by the recipe presentation module 216 based on the next recipe instruction).

In some embodiments, the timer 406 might not be displayed for the entire length of the timer. For example, the timer may only appear when a certain small amount of time is remaining. Alternatively, a visual or auditory signal may occur at one or more predefined points in the timer (such as when five minutes, one minute, and/or thirty seconds remain on the timer). For certain types of recipe actions that should be completed for a predetermined amount of time according to the recipe, such as baking something in an oven, a timer similar to timer 406 may be maintained by the recipe presentation module 216 and optionally displayed based on the specified length of time (for example, the total baking time). Such a timer may be kept running by the recipe presentation module 216 even if other recipe instructions are presented during that time period, such as if the user may continue with other recipe instructions while some ingredients are in the oven.

If the user has finished whipping the cream and would like to move on to the next recipe instruction prior to the expiration of timer 406, the user may select next option 410, which indicates that the next recipe instruction in the strawberry shortcake recipe 402 is summarized as "split cake." Selection of option 410 may result in presentation of a user interface similar to that discussed above as being presenting at the expiration of timer 406. If the user needs additional time to complete the current instruction, or if the user needs to take a break from preparing the recipe, the user may select pause option 412. The user may be able to select timer 406 in order to add a certain amount of time to the timer, such as thirty seconds, as needed. Alternatively, the user may select option 408 in order to step backwards in the recipe to the previous recipe instruction (abbreviated as "slice strawberries"). The recipe presentation module 216 may, in some embodiments, adjust future timer lengths for other recipe instructions presented to the user based on the user's typical pace. For example, if a certain user often needs more time than anticipated for certain types of actions (such as peeling onions), the recipe presentation module 216 may estimate more time than for that specific user and/or for that type of action than the recipe presentation module 216 otherwise would estimate for the action.

Lastly, user interface 400 includes text 414, which indicates that the user's oven will be turning off in one minute. Text 414 may be presented, for example, to a user that has a kitchen equipped with smart home appliances or an intelligent home system, such that computing device 102 can communicate with and/or control the user's oven. The recipe presentation module 216 may have analyzed the remaining recipe instructions in recipe 402 and determined that the oven will not be used again in the recipe, and may be turned off. While text 414 of user interface 400 is displayed in terms of an embodiment in which the recipe presentation module 216 can control the oven directly, in other embodiments, the recipe presentation module 216 may instead present the user with a reminder to turn off the oven. In some embodiments in which the recipe presentation module 216 can control the oven temperature, the recipe presentation module 216 may automatically preheat the oven according to recipe instructions at the beginning of the recipe presentation, and/or may adjust the oven temperature as appropriate during the cooking process. For example, the recipe presentation module 216 may taper down the oven heat gradually based on a suggestion to do so in the recipe and/or based on a determination that other users that have used the recipe in the past have suggested such a temperature change.

While user interface 400 is described above with reference to an embodiment in which recipe instructions are visually displayed, in some embodiments, the recipe instructions may alternatively or additionally be presented as audio data. For example, according to certain embodiments, a recipe presentation presented by the recipe presentation module 216 may enable the user to prepare a recipe based entirely on audio instructions that are timed such that the user does not make any selections or otherwise interact with the computing device 102 during the recipe presentation. The audio data may by prerecorded narration audio data, for example, or speech that is automatically generated by the computing device 102 based on recipe text data.

Similarly, while user interface 400 has been described above with reference to a user interface that includes selectable options, in some embodiments, a user may speak commands that are then interpreted by the computing device 102 based on speech recognition or other audio data interpretation. For example, the user could say the word "next" to request that the recipe presentation module 216 present the next recipe instruction, rather than selecting option 410 in user interface 400. Each selectable option in user interface 400 could similarly be associated with one or more spoken phrases (such as one or more words displayed in association with a given option in the user interface) that a user could say instead of selecting the corresponding user interface option. In some embodiments, a user may alternatively control aspects of the recipe presentation by gestures (such as arm or hand movement) or eye movement without directly contacting any hardware associated with the computing device 102. In some embodiments, the recipe presentation module 216 may alter the presentation based on one or more occurrences outside of the user's control. For example, if the user receives a phone call or the user's door bell rings, the recipe presentation module 216 may automatically pause the recipe presentation. In some such embodiments, the recipe presentation module 216 may alert the user of one or more timing issues that the user should be aware of before pausing the presentation, such as alerting the user to turn down the heat on a stove before answering the door. The recipe presentation module 216 may, in some embodiments, send a text message or other message to a phone or other computing device of the user when an action needs to be taken in the recipe, such as taking something out of the oven. Similarly, the recipe presentation server 104 may send a message to designated people other than the user at certain time in the recipe preparation. For example, the recipe presentation server 104 may send a message to the user's children when the user has finished making dinner.

Figure 5:
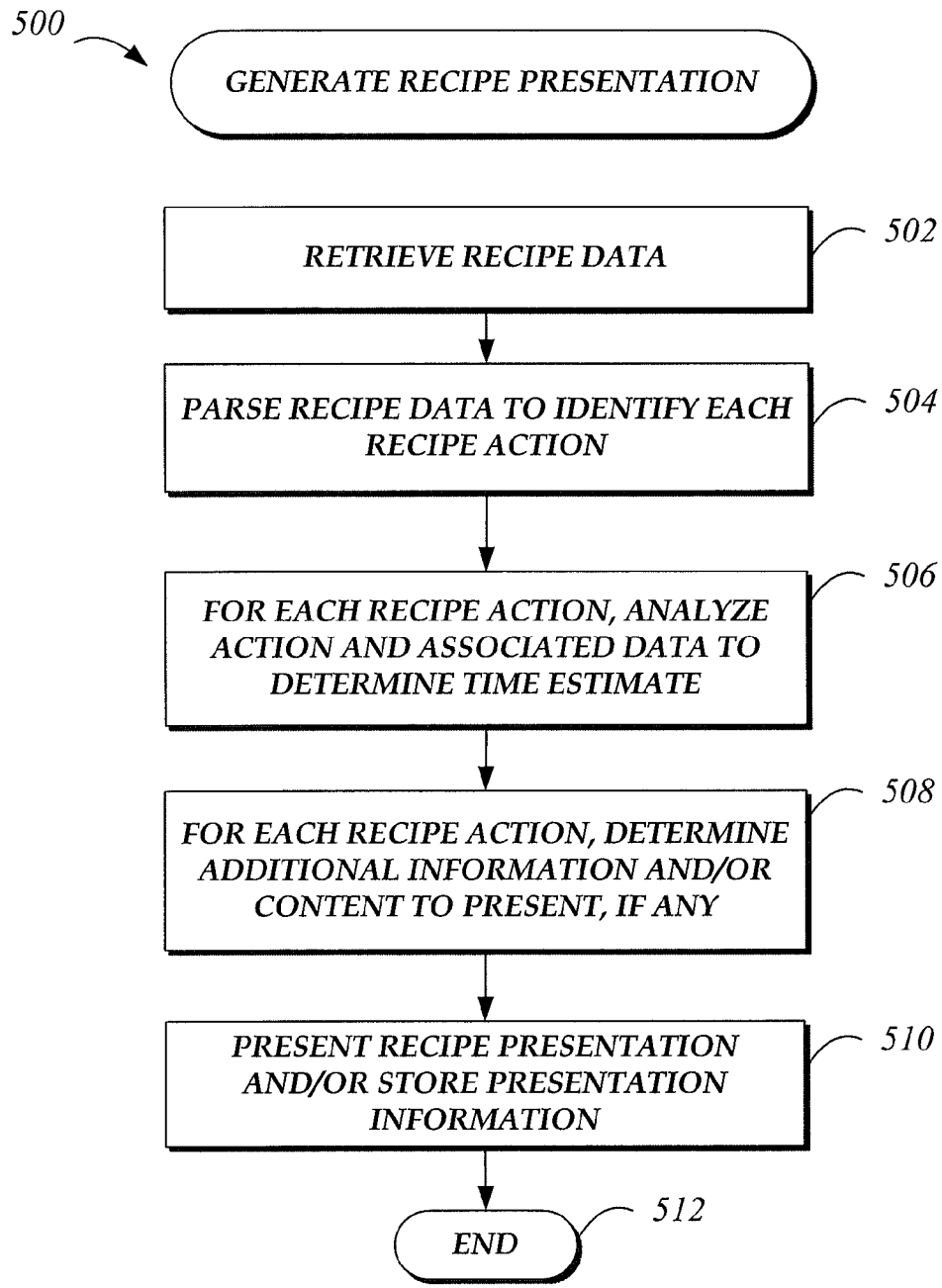
FIG. 5 is a flow diagram of an illustrative method implemented by a user computing device or a recipe presentation server for generating a recipe presentation.

FIG. 5 is a flow diagram of an illustrative method 500 implemented by user computing device 102 and/or recipe presentation server 104 for generating a recipe presentation. While illustrative method 500 will be described below as implemented by the recipe presentation module 216 of computing device 102, it will be appreciated that, in other embodiments, illustrative method 500 may be implemented at least in part by the recipe presentation server 104. Illustrative method 500 and illustrative method 600 are described below as illustrative methods for generating a recipe presentation and presenting a generated recipe presentation, respectively. In other embodiments, a recipe presentation may be presented to a user during the generation of the presentation, such that portions of the recipe presentation may not yet be generated when the start of the presentation is presented to the user.

Illustrative method 500 begins at block 502, where the recipe presentation module 216 retrieves the recipe data to be used as a basis for the recipe presentation. Recipe data may generally include, for example, information regarding the ingredients needed for the recipe and instructions for using those ingredients to make the desired food. The retrieved recipe data, in some embodiments, may include text data, image data and/or audio data. The retrieved recipe data may be, for example, a recipe selected by a user or received from the user. The recipe data may be retrieved, for example, from one or more data stores, such as presentation data store 114 or data store 240. In some embodiments, the recipe data may be retrieved from a location provided to the recipe presentation module 216 by the user, such as a location associated with a third party service, such as content data store 112. As discussed above, in some embodiments, recipe text data may be typed by a user.

In some embodiments, retrieving the recipe data may include altering an initial format of the recipe data to a format that is easier to parse, such as a format that includes text data. For example, if the user uses a scanner or camera to input image data of a recipe, the recipe presentation module 216 may translate the image data to text data, such as by using optical character recognition. If the user speaks or narrates a recipe, such as by reading aloud from a handwritten or printed recipe, the recipe presentation module 216 may convert the recorded audio data to text data, such as by using speech recognition.

At block 504, the recipe presentation module 216 parses the recipe data to identify each recipe action. A recipe action may generally be a portion of the recipe indicating that the user must do something. Accordingly, an action may often include at least one verb, and may be identified based at least in part on an analysis of various directions or instructions included in the recipe and/or based on stored information identifying common actions that appear in recipes. For example, the retrieved recipe data may include a number of directions (which may also be referred to herein as instructions), such as separate paragraphs or numbered elements, that each include one or actions that the user should take when following the recipe. In some recipes, in certain embodiments, a recipe instruction may correspond to a single action (such as "Step 4—Stir mixture"). In other recipes, an instruction may include two or more actions (such as "Step 4—Peel three potatoes and cut each to ⅛ size").

In some embodiments, the recipe presentation module 216 may access a data store, such as presentation data store 114, to identify the actions included in the recipe. For example, the recipe presentation module 216 may identify one or more verbs included in each recipe instruction and search a data store that identifies a large number of actions (e.g., "cut," "peel," "dice," "bake," "sauté," "whip," etc.) to match a known action to a given portion of the recipe. In other embodiments, the recipe presentation module 216 may identify each phrase that includes a verb as an action, or may consider each recipe instruction (for example, each paragraph or other discrete portion of text in the recipe data) as corresponding to an action. In some embodiments, the recipe presentation module 216 may identify an action based on the appearance of certain combinations of words, such as a quantity, descriptor and noun.

Next, at block 506, the recipe presentation module 216 analyzes each recipe action and associated data to determine a time estimate to associate with the recipe action. The time estimate may generally represent the amount of time that the recipe presentation module 216 estimates the given action will take the user to perform or complete. The time estimate for a given action may be calculated based at least in part on data stored in a data store, such as presentation data store 114. For example, presentation data store 114 may include, for each action identified, a general time estimate associated with that action. For example, an action that include the word "peel" may generally be indicated as taking the average individual forty-five seconds to complete one unit (which may correspond to peeling a single item, such as one potato). Certain actions, in some embodiments, may be associated with different average time estimates depending on the item or object of the action. For example, a "peel" action may be associated with a different time estimate for a banana than for an onion. In some embodiments, a range of time estimates may be stored for each action, which may indicate that an individual with relatively little cooking experience is likely to be at the higher end of the time estimate range, while an experienced chef is likely to be at the lower end of the time estimate range. In some embodiments, the estimates and/or ranges may have been determined by the recipe presentation module 216 based on collected data associated with one or more users, such as the amount of time that various users took to complete a given action when following previously generated recipe presentations.

Determining the time estimate may include, in some embodiments, multiplying a retrieved time estimate for the action by the number of units. For example, if a recipe instruction includes the text "Peel four onions," the recipe presentation module 216 may multiply the retrieved time estimate associated with peeling a single onion by the number of onions to be peeled. The recipe presentation module 216 may then, in some embodiments, adjust the determined time estimate based on the user's experience level, which may be provided by the user, be stored in presentation data store 114, and/or be determined by the recipe presentation module 216 based on the user's pace when completing previous recipes. In some embodiments, if the recipe presentation module 216 is unable to determine a time estimate for a given action or recipe instruction based on stored data, the recipe presentation module 216 may associate a default time estimate to the action based on some recognized aspect of the instruction. For example, if an instruction includes an action with which the recipe presentation module 216 has not previously stored time estimate information, the recipe presentation module 216 may calculate a time estimate based on the number of units and/or type of ingredients associated with the action.

At block 508, the recipe presentation module 216 optionally determines, for each recipe action, additional information and/or content to present in association with the action. For example, the recipe presentation module 216 may select image content, text content, audio content, and/or video content to associate with a given action in the recipe. The additional content may be, for example, content that provides the user with more detail regarding how to perform an action, background information about an ingredient related to the current recipe instruction, and/or content regarding additional related actions that the user could take beyond those included in the recipe. For example, if the action requests that the user finely dice a certain ingredient, the additional content could include a video of a chef finely dicing the ingredient, or could include an image showing what the ingredient should look like after being finely diced. As another example, the additional content could be audio data describing the reasons for finely dicing the ingredient and the effect of dicing on the taste of the finished product.

In some embodiments, the presentation data store may store one or more additional content items in association with various actions, which the recipe presentation module 216 may retrieve at block 508. In some embodiments, the additional content may be retrieved from one or more additional data store or services, such as content data store 112 or content server(s) 106. For example, the recipe presentation module 216 may search one or more content sources for additional content associated with the action, such as by searching keywords or metadata associated with content items for terms associated with the given action or recipe instruction (such as the action verb itself and/or the object of the action).

At block 510, the recipe presentation module 216 presents the recipe presentation to a user (discussed with reference to FIG. 6 below) and/or stores the presentation information to be presented at a later time. The presentation information may include, for example, the recipe instructions, the time estimates associated with each recipe instruction and any additional content associated with each instruction. As will be appreciated, information may be stored that is sufficient to identify the additional content without storing the additional content itself in association with storage of the presentation information. The illustrative method then ends at block 510.

Figure 6:
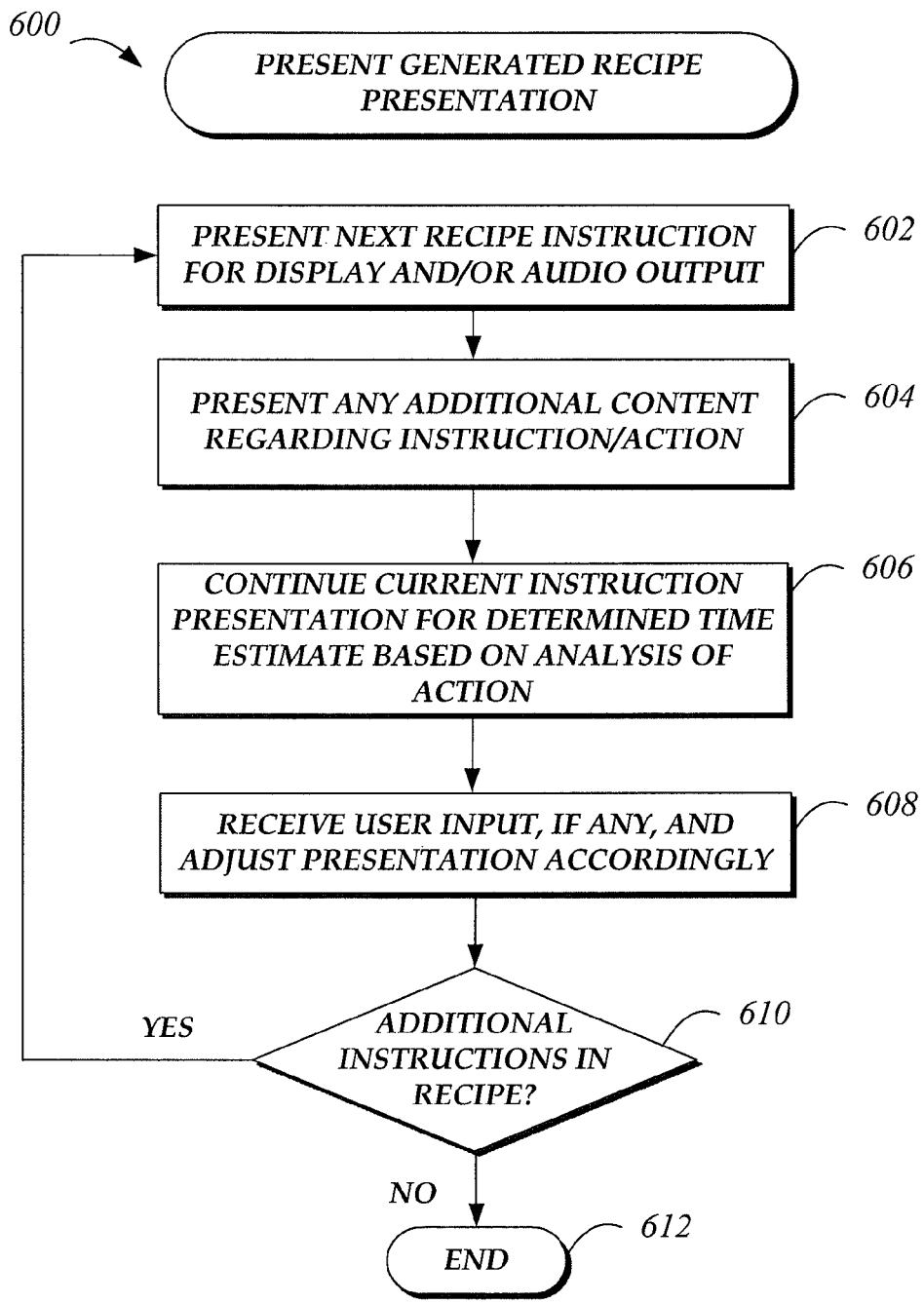
FIG. 6 is a flow diagram of an illustrative method implemented by a user computing device or a recipe presentation server for presenting a generated recipe presentation.

FIG. 6 is a flow diagram of an illustrative method 600 implemented in part by user computing device 102 and/or in part by recipe presentation server 104 for presenting a generated recipe presentation to a user. In some embodiments, illustrative method 600 may be implemented at block 510 of illustrative method 500 discussed above. Accordingly, method 600 is described with reference to an embodiment in which the presentation information has already been generated and stored. As discussed above, in other embodiments, the presentation information may be determined during presentation of the recipe to the user. The illustrative method 600 may begin, for example, once a user has selected to begin presentation of a recipe that the user would like to follow.

The illustrative method begins at block 602, where the recipe presentation module 216 presents the first recipe instruction for display and/or audio output. For example, text corresponding to the recipe instruction may be displayed in a user interface presented to the user, similar to that described above with reference to FIG. 4. Additionally or alternatively, the recipe presentation module 216 may cause audio output of the instruction, such as by playing prerecorded narration audio of an individual (such as a celebrity or well known chef, for example) reading the first recipe instruction. The presentation of the first recipe instruction may additionally include display of video content synchronized with the audio output. In other embodiments, the audio output may be automatically generated by the computing device 102 or recipe presentation server 104 based on text-to-speech methods being applied to text data corresponding to the current recipe instruction. In some embodiments, the user may be able to select a voice for the recipe presentation during the presentation and/or in user preferences associated with the user. For example, the user may be able to select an accent and gender for computer-generated voices, and/or may be able to select from multiple pre-recorded voices, such as different actors or chefs.

At block 604, the recipe presentation module 216 presents any additional content regarding the current instruction or action(s). For example, after or during the presentation of the first instruction, the recipe presentation module 216 may present additional content that the recipe presentation module 216 has associated with the first instruction, or to one or more actions within the first instruction (discussed above). As indicated by block 606, the recipe presentation module 216 continues the portion of the presentation associated with the current instruction (which may include displaying the current instruction and/or presenting additional content associated with the current instruction) for the determined time estimate that the recipe presentation module 216 has associated with the recipe instruction (or with the action(s) that make up the instruction). For example, if the recipe presentation module 216 determined that the current instruction (for example, "cook meat until 160 degrees") is associated with a time estimate of nine minutes, the recipe presentation module 216 may continue the portion of the presentation corresponding to the current instruction for nine minutes before moving on the next instruction in the recipe. In some embodiments, the user may modify this timing based on the user's input during the presentation, as discussed below.

At block 608, the recipe presentation module 216 receives user input, if any, and adjusts the presentation accordingly. As discussed above, user input may be received in various forms, depending on the embodiment, including touch, selection of a user interface element, gesture, voice control, etc. The user input may correspond to a user request that includes, for example, stepping backwards in the recipe presentation to the previous instruction, stepping forwards in the recipe presentation to the next instruction, pausing the recipe presentation, adding additional time to a timer associated with the current recipe instruction, selection of additional content, selection of changes or substitutions in the recipe, selection of additions to the recipe, etc. Examples of user input and corresponding changes to the presentation are discussed in more detail above with reference to FIG. 4 and below with reference to FIG. 7. At block 610, the recipe presentation module 216 determines whether there are additional instructions to present in the current recipe. If so, the recipe presentation module 216 presents the next recipe instruction at block 602. If not, the illustrative method 600 ends at block 612.

While not illustrated in FIG. 6, in some embodiments, the recipe presentation server 104 may communicate with one or more devices that enable the recipe presentation server 104 to determine whether a user has successfully completed a recipe instruction. For example, an electronic thermometer may provide the recipe presentation server 104 with temperature data to determine whether a user has fully cooked a given piece of meat according to a recipe instruction. Similarly, a device capable of measuring force or hardness may be used to determine whether a food item is the proper consistency after cooking. In other embodiments, the user may take a photograph of the food he has prepared. The photograph may be analyzed by the recipe presentation server 104 to determine if the food was properly prepared, such as by comparing the image data to an image of a properly prepared item. Alternatively, the image could be provided by the computing device 102 to one or more individuals to judge whether the food has been properly prepared.

Figure 7:
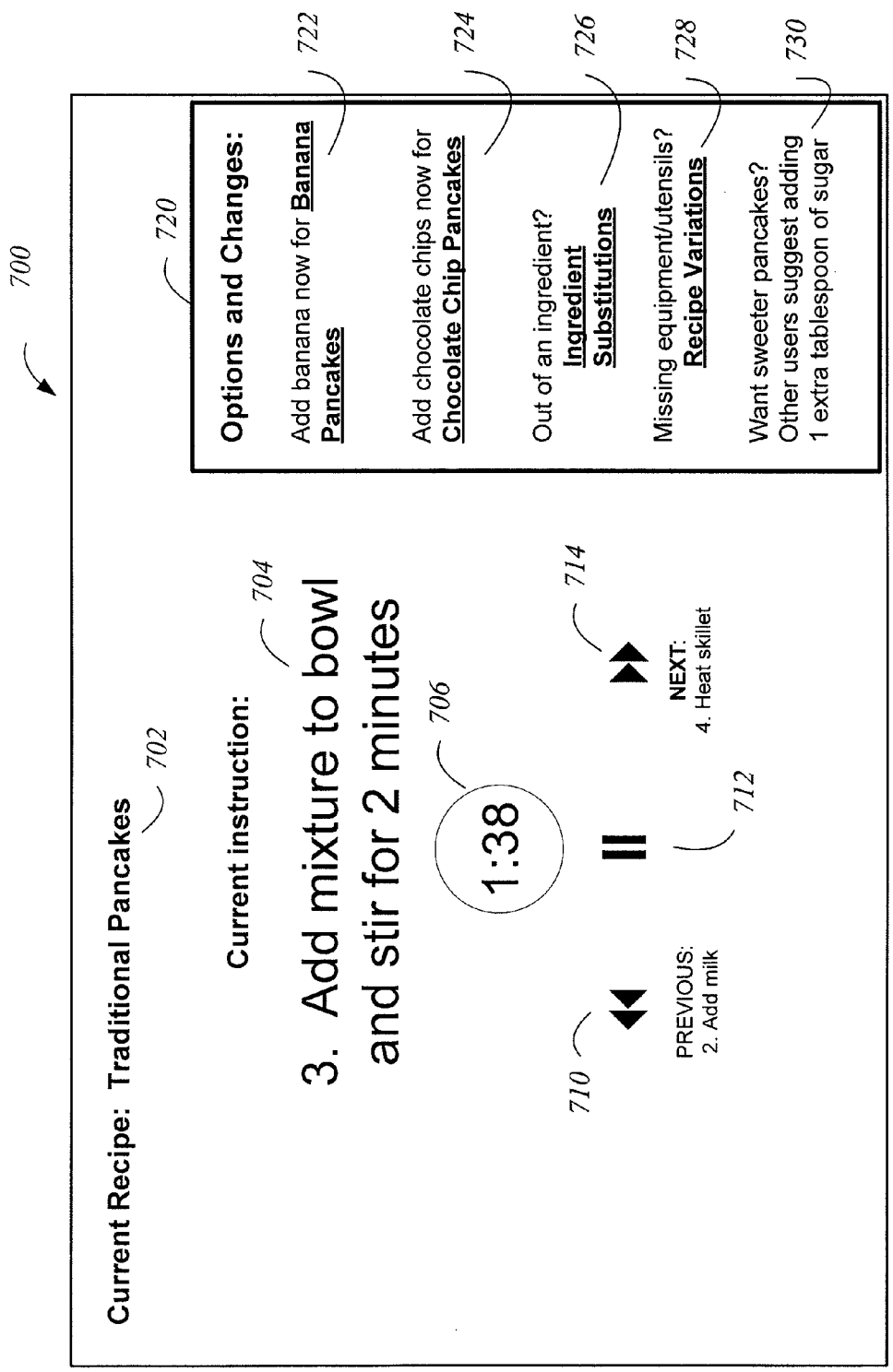
FIG. 7 is an illustrative user interface generated by a computing device that is displayed during a recipe presentation, which includes a current recipe instruction and options for adjusting the recipe.

FIG. 7 is an illustrative user interface 700 generated by computing device 102 and/or recipe presentation server 104, which may be displayed during a recipe presentation associated with recipe 702. As illustrated, the user interface 700 includes a current recipe instruction 704 (indicated by the text "add mixture to bowl and stir for 2 minutes"). The user interface also includes timing control options 710, 712 and 714, which are similar to options discussed above with reference to FIG. 4. Timer 706, which reads "1:38," may have been initially set to two minutes, based on the recipe instruction including a time indication of two minutes associated with the "stir" action of instruction 704. Because the instruction 704 may be interpreted, in some embodiments, as including two actions ("add mixture to bowl" and "stir"), the recipe presentation module 216 may have waited for an amount of time estimated for the "add mixture to bowl" action prior to starting timer 706 at two minutes.

Illustrative user interface 700 additionally includes options 720 for adjusting the recipe 702. Options 720 may have each been determined by the recipe presentation module 216 based on the recipe data associated with recipe 702, recipe data associated with other recipes, stored user data or preferences associated with the user, and/or feedback received from other users. Option 722, for example, may be selected by the user in order to view more information regarding how to add an additional ingredient (in this case, bananas) to the original recipe 702 to change the recipe from one for traditional pancakes to one for banana pancakes. The recipe presentation module 216 may have presented option 722, for example, based on a determination that a certain banana pancake recipe (stored in presentation data store 114 or elsewhere) was very similar to the current recipe other than a certain ingredient and instruction. Similarly, options 720 also include option 724 to add chocolate chips for chocolate chip pancakes, which may have been presented as an option based on a different recipe similarity determined by the recipe presentation module 216 and/or based on a suggestion by another user.

User selection of option 726 may enable the user to substitute an ingredient in the recipe for a different ingredient, which may be suggested to the user by the recipe presentation module 216 based on ingredient similarity information and/or user feedback data stored in presentation data store 114. In some embodiments, some substitutions that are either presented to the user or automatically made by the recipe presentation server 104 may be based on the user's preferences, such as an indication that the user prefers gluten-free food. The recipe presentation server 104 may additionally consider, in some embodiments, user preferences associated with one or more individuals other than the user, such as a dinner guest or a significant other. If the user is missing equipment or utensils called for by recipe 702, option 728 may enable the user to view recipe variations (or related recipes) that do not require any equipment that the user does not own. Lastly, option 730 provides the user with information regarding making sweeter pancakes, which may have been presented by the recipe presentation module 216 based on user feedback received from other users.

In some embodiments, the user may be presented with one or more options that enable the user to share a changed or modified recipe with one or more other users (not illustrated in FIG. 7). For example, one or more user interface options similar to options 720 in user interface 700 may be presented to the user that enable the user to store, export and/or share the presentation that the user has been presented with and/or has modified according to one or more options or recipe changes. Accordingly, other users may be able to view the recipes that the user has viewed and/or modified, along with additional information regarding one or more of the stored or shared presentations. For example, additional information could include an indication of how common a given recipe change is, which versions of a recipe are the most popular or have received the most feedback, etc.

According to some embodiments, a user interface similar to user interface 700 may be presented to a user that includes comments or suggestions associated with the recipe that have been submitted to the recipe presentation server 104 while one or more other users are presented with the same or similar recipe presentation. In some embodiments, other users' comments or suggestions may be displayed to the user in real-time or near real-time as the other users submit the comments. For example, a recipe presentation may be presented to a number of users that are all watching the same cooking show on television (or cooking video accessible via a network, such as the Internet) while following a recipe presentation associated with the cooking show. In some such embodiments, users may offer advice, suggested recipe changes, and/or other comments to each other regarding the recipe via a user interface presented in association with the recipe presentation.

Figure 8:
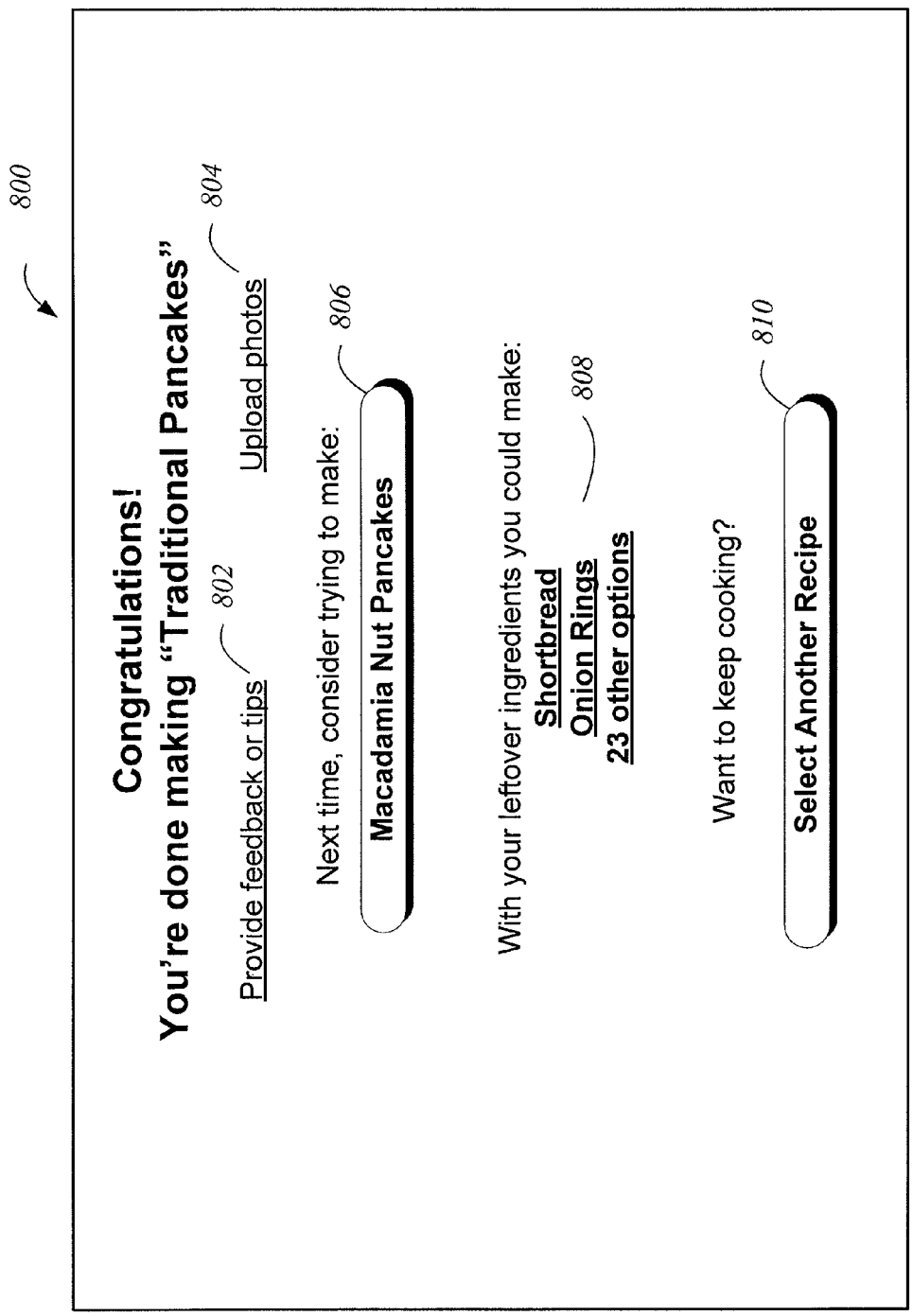
FIG. 8 is an illustrative user interface generated by a computing device that may be displayed at the end of a recipe presentation.

FIG. 8 is an illustrative user interface 800 generated by the computing device 102 and/or recipe presentation server 104 that may be displayed at the end of a recipe presentation. As illustrated, user interface 800 includes option 802 for the user to provide feedback regarding the completed recipe to the recipe presentation server 104. The user interface also includes option 804, which the user may select in order to provide the recipe presentation server 104 with a photo of the finished product that the user baked according to the recipe. The user may select recipe suggestion option 806 in order to view or flag for later use a recipe for "macadamia nut pancakes." This recipe may have been recommended by the recipe presentation server 104, for example, based on similarities between the completed recipe and the recommended recipe, and/or based on positive feedback from users that have followed the recommended recipe.

User interface 800 additionally includes options 808, which identify recipes that the user could complete using either only or mostly leftover ingredients form the recipe that the user just completed. The recipes 808 may have been determined by the recipe presentation server 104 based on comparing ingredients in the recipe that the user just completed with ingredients in other recipes stored in presentation data store 114 (or some other data source). In some embodiments, the recipe presentation server 104 may also keep a record of the ingredients and/or tools that the user has in his kitchen at a given time, and may use such user data to recommend recipes. The recipe presentation server 104 may, in some embodiments, present the user with options to purchase additional recommended items or ingredients (not illustrated), such as if the recipe presentation server 104 identifies that the user is missing a common ingredient or an ingredient needed for a certain recipe of interest. If the user would like to browse other recipes to try, the user may select option 810, which may result in the recipe presentation server 104 generating a user interface similar to that discussed above with reference to FIG. 3.

While the example of a recipe presentation is often used in the present disclosure, presentations may be generated and presented to a user, in some embodiments, based on various types of instruction sets. Accordingly, in some embodiments, a presentation may be generated that presents a set of instructions to a user regarding how to perform a task other than making or preparing food. A set of instructions could be presented, for example, that instruct a user how to build or assemble a piece of furniture, paint or draw a certain subject, assemble a computer, change a tire, use a given software feature, complete a home improvement task, and/or any other action or task that may be accomplished according to a set of instructions. As will be appreciated, various aspects of the present disclosure described above with reference to a recipe may be equally applicable to other sets of instructions.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for generating a recipe presentation, the system comprising:
   a data store that stores one or more recipes that each include instructions for preparing food, each recipe comprising text data; and
   a computing device in communication with the data store and that is configured to at least:
      retrieve a recipe from the data store;
      parse the text data of the recipe to identify a plurality of recipe actions;
      for each recipe action identified, analyze the identified action to determine a time estimate associated with the action, wherein the time estimate represents an estimated time for the identified action to be completed by a user;
      for one or more of the plurality of recipe actions, determine additional content to associate with the one or more of the plurality of recipe actions, wherein the additional content comprises at least one of visual content or audio content; and
      present each recipe action, wherein a time period between presentation of each recipe action is based at least in part on the time estimate determined for the recipe action, wherein the additional content associated with the one or more of the plurality of recipe actions is presented in association with presentation of the one or more of the plurality of recipe actions.

2. The system of claim 1, wherein presenting each recipe action comprises causing output of audio content corresponding to the recipe action.

3. The system of claim 2, wherein the audio content comprises at least one of prerecorded narration audio data or audio data automatically generated based at least in part on text data of the recipe.

4. The system of claim 1, wherein presenting each recipe action comprises presenting for display text data corresponding to the recipe action.

5. A computer-implemented method for presenting a set of instructions, the computer-implemented method comprising:
   as implemented by one or more computing devices configured with specific executable instructions,
      analyzing a set of instructions to identify an instruction;
      determining a time estimate associated with the identified instruction, wherein the time estimate represents an estimated time for the identified instruction to be completed by a user;
      presenting the instruction; and
      based at least in part on a determination that an amount of time equal to the time estimate has elapsed after presenting the instruction, automatically presenting one or more additional instructions.

6. The computer-implemented method of claim 5, wherein determining a time estimate associated with the identified instruction comprises parsing the instruction to identify an action and a quantity associated with the action.

7. The computer-implemented method of claim 5, further comprising determining the set of instructions based at least in part on an image that includes instruction text.

8. The computer-implemented method of claim 5, further comprising determining the set of instructions based at least in part on spoken words included in audio data.

9. The computer-implemented method of claim 5, further comprising, prior to analyzing the set of instructions, retrieving the set of instructions from a location provided by the user.

10. The computer-implemented method of claim 5, wherein the time estimate is determined based at least in part on an experience level associated with the user.

11. The computer-implemented method of claim 5, further comprising sending a message to a computing device associated with the user based at least in part on the determination that the amount of time equal to the time estimate has elapsed.

12. The computer-implemented method of claim 5, further comprising, based on a request received from the user, presenting a previous instruction or a next instruction.

13. A non-transitory computer-readable medium storing computer executable instructions that, when executed by one or more computing devices, configure the one or more computing devices to perform operations comprising:
   calculating a time estimate for each of two or more instructions associated with a set of instructions, wherein the time estimate for each of the two or more instructions represents an estimated time for the instruction to be completed by a user, wherein the time estimate is calculated based at least in part on user data associated with one or more users;
   storing, in computer memory, presentation information associated with the set of instructions, wherein the presentation information identifies each of the two or more instructions and the time estimate associated with each of the two or more instructions;

presenting, based on the stored presentation information, a first instruction of the two or more instructions; and based at least in part on a determination that an amount of time equal to a time estimate stored in association with the first instruction has elapsed after presenting the first instruction, automatically presenting a second instruction of the two or more instructions.

14. The non-transitory computer-readable medium of claim 13, wherein the two or more instructions are presented with a time delay between presenting each of the two or more instructions, wherein each time delay is based at least in part on the time estimate associated with one or more of the instructions.

15. The non-transitory computer-readable medium of claim 13, wherein the presentation information is stored in response to a user request to present a presentation.

16. The non-transitory computer-readable medium of claim 13, wherein storing the presentation information associated with the set of instructions includes adjusting at least one of a time estimate or an ingredient identifier based at least in part on user data associated with one or more users.

17. A system comprising:
a data store that stores data associated with one or more sets of instructions; and
a computing device in communication with the data store and that is configured to at least:
retrieve a set of instructions from the data store;
analyze the set of instructions to identify two or more instructions, the two or more instructions comprising a first instruction and a second instruction;
determine a time estimate associated with the first instruction, wherein the time estimate represents an estimated time for the first instruction to be performed by a user;
present audio data associated with the first instruction; and
based on a determination that an amount of time equal to the time estimate associated with the first instruction has elapsed since presenting the audio data associated with the first instruction, automatically present audio data associated with the second instruction.

18. The system of claim 17, wherein the set of instructions correspond to a recipe for preparing food.

19. The system of claim 17, wherein the computing device is further configured to at least present additional content in a time period between the presentation of the audio data associated with the first instruction and the presentation of the audio data associated with the second instruction, wherein the additional content comprises at least one of audio content or video content.

20. The system of claim 17, wherein the computing device is further configured to at least provide one or more options that enable the user to select a change to one or more of the instructions.

21. The system of claim 20, wherein the computing device is further configured to at least provide one or more options that enable the user to share with one or more other users the change to the one or more of the instructions.

22. The system of claim 17, wherein the computing device is further configured to at least replace one of the two or more instructions with a different instruction based at least in part on feedback from one or more users.

23. The system of claim 17, wherein the computing device is further configured to at least add an instruction to the set of instructions based on a user selection.

24. The system of claim 17, wherein the computing device is further configured to at least present one or more additional sets of instructions based at least in part on remaining ingredients after all instructions associated with the set of instructions have been performed.

25. The system of claim 17, wherein the computing device is in communication with a home appliance.

26. The system of claim 25, wherein the computing device is further configured to at least adjust settings associated with the home appliance based at least in part on the two or more instructions.

* * * * *